United States Patent [19]
Sasaki et al.

[11] 3,913,387
[45] Oct. 21, 1975

[54] ULTRASONIC FLAW DETECTOR

[75] Inventors: Soji Sasaki; Masaharu Tadauchi; Takashi Ito, all of Hitachi, Japan

[73] Assignee: Hitachi, Ltd., Japan

[22] Filed: July 11, 1973

[21] Appl. No.: 378,187

[52] U.S. Cl. .............................................. 73/67.8 S
[51] Int. Cl.² ........................................ G01N 29/04
[58] Field of Search............ 73/67.8 R, 67.8 S, 67.9

[56] References Cited
UNITED STATES PATENTS
| | | | |
|---|---|---|---|
| 3,023,611 | 3/1962 | Howry | 73/67.8 S |
| 3,086,390 | 4/1963 | Brown | 73/67.8 S |
| 3,308,652 | 3/1967 | Appel et al. | 73/67.8 S X |

OTHER PUBLICATIONS
D. Sproule, An Ultrasonic Imaging System for Flaw Detection, Conference: Ultrasonics for Industry, 1969 Conference Papers, London, England, Oct. 1969.

*Primary Examiner*—Richard C. Queisser
*Assistant Examiner*—John P. Beauchamp
*Attorney, Agent, or Firm*—Craig & Antonelli

[57] ABSTRACT

An ultrasonic flaw detector which detects acoustic interfaces of internal flaws and abnormal portions of the material of an object by means of ultrasonic wave, and displays their positions and shapes.

This invention is such that an acoustic sectional image of a hard material is displayed by a compound scan comprising transfer scan and sector scan using an ultrasonic beam through a variable-angle beam probe in direct contact with the hard object material and characterized in that the refraction of the ultrasonic beam at the incident point into the object material is corrected thereby to faithfully display its acoustic sectional image.

11 Claims, 7 Drawing Figures

ULTRASONIC FLAW DETECTOR

BACKGROUND OF THE INVENTION

1. Field of the Invention

This invention relates to an ultrasonic flaw detector which detects acoustic interfaces of internal flaws and any other defects of the material of an object by means of ultrasonic wave or beam, and displays their positions and shapes.

2. Description of the Prior Art

Well-known conventional techniques for detecting flaws and the like within an object material by means of ultrasonic wave include what is called the pulse echo method in which ultrasonic pulses are made to penetrate the object material and echo signals reflected and fed back from within the material are received for identification of any flaws or the like that may exist in the material.

It is also well known that the most widely-used display system for the pulse echo method of flaw detection is the A scope method in which changes in signal intensity with time, that is to say, signal waveform is displayed. According to the A scope method, however, it is often very difficult, especially when a complicated shape of the object material is involved, to identify the internal point from which each of the many echo signals displayed on the display section of the picture tube is reflected.

This advantage of the A scope method is obviated by the B scope method in which for the purpose of display of a sectional image of the object material, the scanning line displayed on the picture tube is brightness-modulated and transferred in synchronism with the penetration pass of the ultrasonic beam. In view of the fact that the image of echo signals attributable to the presence of flaws and other defects of the material in the object indicates not only the positions occupied by such defects in the sectional area but the shapes thereof, the advantage results that inspection results are easily identified.

It is also well known that in the case where the ultrasonic beam is reflected in many directions from a face such as an interface formed by the periphery of the internal organs or frames of a living thing, a compound scan system is preferably used which combines a sector scan for arcuately changing the direction of an incident ultrasonic beam with a transfer scan for relocating the transmitting/receiving point, that is, a probe position, so that the scanning line position on the display section of a picture tube is changed in synchronism with the pass of the ultrasonic beam and the scanning line is brightness-modulated by means of received echo signals, thus displaying the state of a section of the object material.

Of the above-mentioned compound scanning methods, the sector scanning methods include the water immersion method in which liquid such as water is used as a transmission medium to change the direction of probe freely, and when the object material consists of a living thing or the like covered with soft surface texture, a method in which the direction of the probe, that is, the direction of transmission of ultrasonic beam is changed while maintaining the probe in direct contact with the object material.

This direct contact method, however, can not be applied to those object materials which consist of metal or other hard material with the sound velocity therein different from that in an ultrasonic transmission medium.

In what is called the water immersion method employing a liquid like water as a contact medium, the ultrasonic beam is refracted at the incident plane and therefore the scanning line for displaying an image of the object material on the B scope requires to be refracted accordingly. It is however very difficult to refract the scanning line successfully in the case where the length of the ultrasonic transmission path in the medium liquid from the point wherefrom the ultrasonic pulses are transmitted to the incident plane of the object material is variable.

Further, the conventional methods mentioned above have the disadvantage that in view of the fact that an ultrasonic beam enters the object material from many directions in sector scan, the efficiency of transmission of ultrasonic beam from the transmission medium into the object material with the incident angle, with the result that the detection sensitivity depends on the direction in which a flaw is positioned.

SUMMARY OF THE INVENTION

In order to obviate the above-mentioned problems, a novel ultrasonic flaw detector is provided according to the invention, in which the compound scan is used to detect and display the positions and shapes of acoustic interfaces of flaws and defects of a hard object material.

Accordingly, it is an object of the invention to provide an ultrasonic flaw detector which is capable of clearly displaying a sectional echo pattern of the object material on the picture tube by the compound scan of a probe, thus enabling exact and faithful flaw detection.

Another object of the invention is to provide an ultrasonic flaw detector which is capable, by sector scan, of accurately and faithfully displaying an acoustic sectional image of an object material in which the velocity of sound is different from that in an ultrasonic transmission medium.

In order to achieve the above-mentioned objects, the invention is characterized in that the scanning line for displaying an acoustic sectional image is controlled in accordance with the transmission path of ultrasonic beam.

DESCRIPTION OF THE PREFERRED EMBODIMENTS

Figure 1:
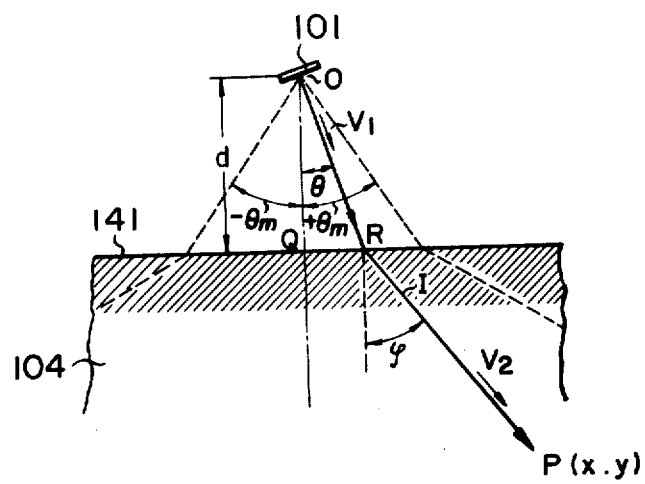
FIG. 1 is a diagram showing paths of ultrasonic beam, for explanation of the operation of the probe used in the apparatus according to the invention.

The principle on which the apparatus according to the invention operates will be explained first with reference to FIGS. 1 and 2.

Assuming that an oscillation element 101 transmitting and receiving ultrasonic wave is positioned at an angle $\theta$ with respect to the normal OQ to the face 141 of the object material and that it takes time $t_P$ for ultrasonic pulses to reach point P through incident point R of the object material after they are transmitted at time $t = 0$ from point O ($x = 0, y = 0$) where the oscillation element is positioned, the coordinate of point P is expressed as $$x = d \tan \theta + V_2 \sin \phi \cdot (t_P - t_R) \quad (1)$$
$$y = d + V_2 \cos \phi \cdot (t_P - t_R) \quad (2)$$

where $$t_R = \frac{d}{V_1 \cos \theta}.$$

$V_1$ the velocity of sound in the medium extending from the oscillation element 101 to the face 141 of the object material and $V_2$ the velocity of sound within the object material 104.

According to Snell's law, the refraction angle $\phi$ of the ultrasonic beam at the incident plane of the object material 104 is $$\sin \phi = \frac{V_2}{V_1} \sin \theta$$

As a result, equations (1) and (2) are rewritten as $$x = d \tan \theta + \frac{V_2^2}{V_1} \sin \theta (t - t_R) \quad (3)$$

$$y = d + V_2 \sqrt{1 - \left(\frac{V_2}{V_1}\right)^2 \sin^2 \theta} \, (t - t_R) \quad (4)$$

where $t$ is a generalized instant of time for any point P. If the refractive index $n = V_2/V_1$ is substituted into equations (3) and (4), $$x = d \tan \theta + n V_2 \sin \theta (t - t_R) \quad (5)$$
$$y = d + V_2 \sqrt{1 - n^2 \sin^2 \theta} \, (t - t_R) \quad (6)$$

Figure 2:
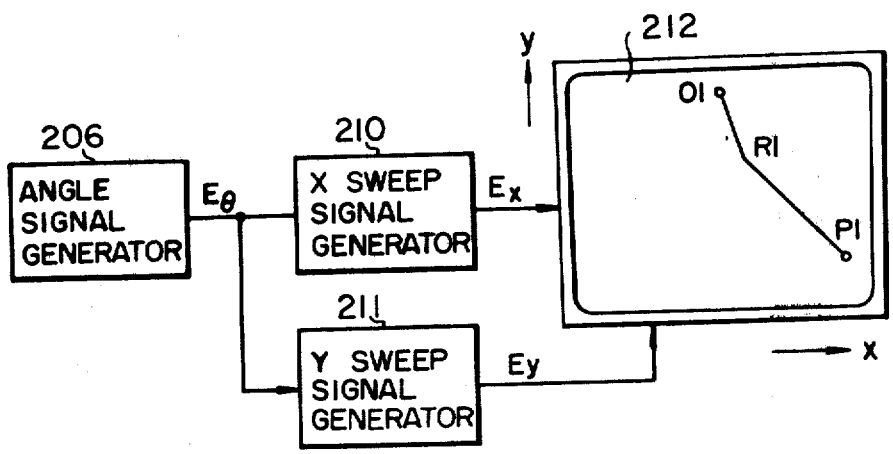
FIG. 2 is a block diagram showing means for displaying scanning lines on an image display section in accordance with the paths of the ultrasonic beam transmitted and received by the probe used in the apparatus of the invention.

The values $d$ and $V_1$ depend on the size and material of the probe provided with the oscillation element 1 while $V_2$ is a value specific to the substance of the object material, and therefore, with reference to the block diagram of FIG. 2 showing the means for displaying the scanning line, if electrical signal $E_\theta$ corresponding to the incident angle $\theta$ is obtained from an angle signal generator 206, sweep signals for X and Y axes required for display of the scanning lines on the display section in accordance with the transmission path ORP of the ultrasonic beam can be produced by providing an X-axis sweep signal generator means 210 and a Y-axis sweep signal generator means 211 which operate on the basis of equations (3) and (4) respectively. The output signals E$x$ and E$y$ from the sweep signal generator means 210 and 211 are applied to the display section 212 of a B scope picture tube as X- and Y-axis deflection inputs respectively thereby to display scanning line O1.R1.P1 corresponding to transmission path ORP of ultrasonic beam. The fact that a sectional image representing the shape of acoustic interfaces is displayed by brightness-modulating the resulting scanning line by means of an echo signal produced from inside of the object material is well known as what is called the B scope technique.

Taking into consideration the fact that the feedback time of the echo signal is equal to the time required for the ultrasonic beam to return from point P to point O through point R and assuming that signals corresponding to the co-ordinate $(x_0, y_0)$ of point O is produced by a not-shown position detector means, the relation shown by equations (7) and (8) below, instead of equations (5) and (6), have to be established between the sweep signals E$x$ and E$y$.

$$Ex = x_o + d \tan \theta + n \cdot \frac{V_o}{2} \sin \theta \, (t - t'_R) \quad (7)$$

$$Ey = y_o + d + \frac{V_2}{2} \sqrt{1 - n^2 \cdot \sin^2 \theta} \, (t - t'_R) \quad (8)$$

where $t'_R = 2 t_R$.

An actual example of the construction of an ultrasonic probe used in embodying the invention will be explained with reference to FIGS. 3$a$ and 3$b$.

Reference numeral 101 shows an oscillation element for transmitting and receiving ultrasonic pulses, numeral 302 a movable shoe made of a material permitting of good transmission of ultrasonic wave, which is acoustically coupled to the oscillation element 101 and capable of rotation or reciprocal arcuate movement about the central axis A, numeral 303 a holding shoe for holding the movable shoe 302, and numerals 321 and 331 a sliding surface and an interface with the object material respectively. A liquid contact medium such as water, oil, glycerine or the like is applied to the sliding surface 321 and the contact surface 331 to maintain acoustic contact for smooth transmission of ultrasonic wave. Reference numeral 305 shows an operating lever for reciprocally rotating the movable shoe 302 about the central axis A, in such a manner that the resulting reciprocal rotation is used to vary the incident angle $\theta$ at which the ultrasonic beam I transmitted from the oscillation element 101 enters the object material 104 through the movable shoe 302 and the holding shoe 303. This operation may be performed automatically by a motor or other mechanical power supply means. Reference numeral 306 shows a potentiometer for generating an electrical signal $E_\theta$ corresponding to the angle $\theta$ varying with the arcuate reciprocal movement of the movable shoe 302, the arcuate reciprocal movement of the movable shoe being transmitted through the gears 307 and 308. Reference numeral 309 shows a mounting board on which the variable angle beam probe comprising the movable shoe 302 and the holding shoe 303 and the potentiometer 306 are mounted.

As will be seen from the above explanation, the use of a variable angle beam probe permits an ultrasonic beam to be transmitted and received in any desired angle $\theta$ within the limitations ranging from $-\theta_m$ to $+\theta_m$ on one hand, while an electrical signal corresponding to the direction of transmission and reception is obtained on the other. Further, the oscillation element, the position of which is always measurable with respect to the face of the object material, is suitably used with the ultrasonic beam flaw detector of compound type according to the invention.

Figure 4:
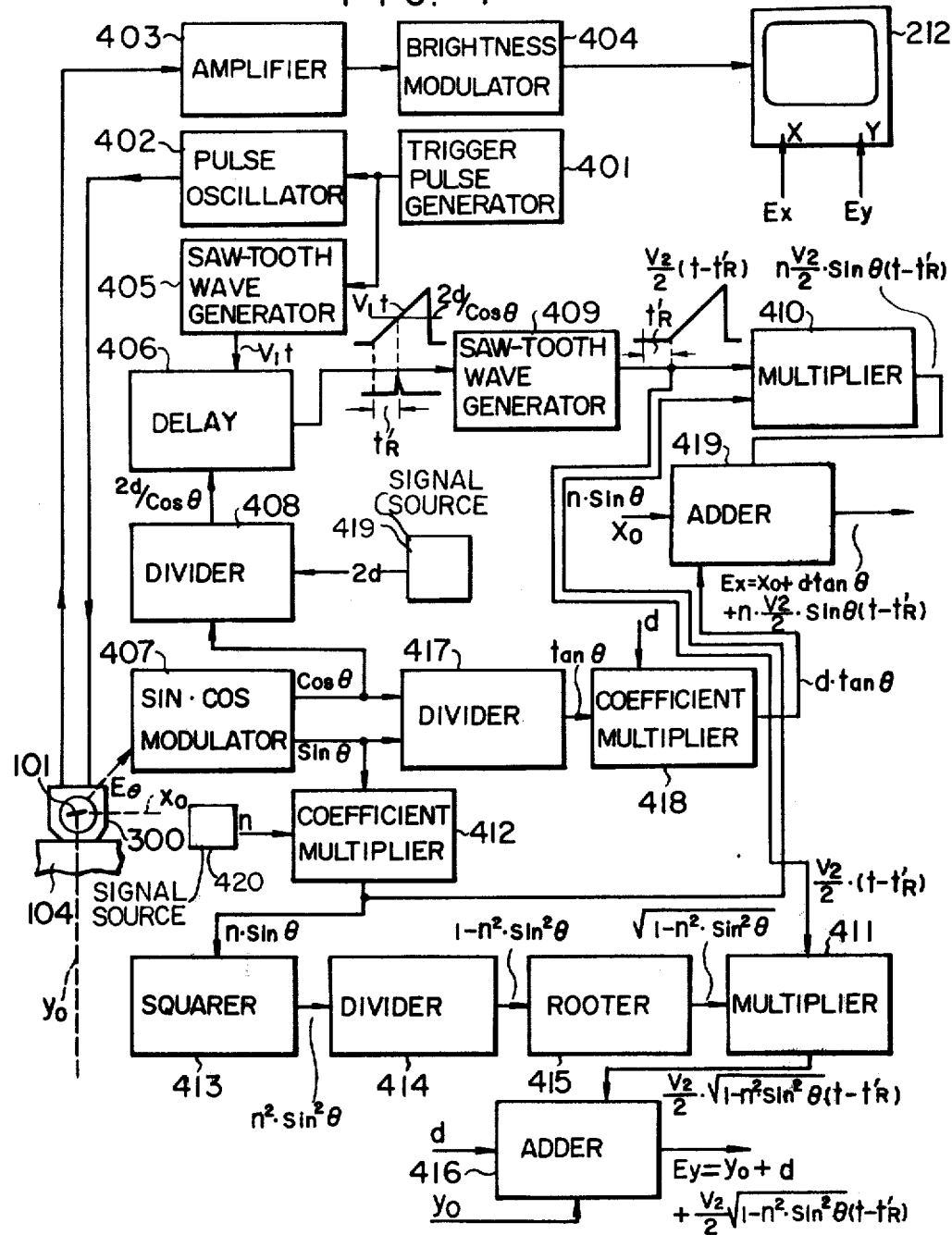
FIG. 4 is a block diagram showing an embodiment of the invention.

A circuit device embodying the invention for generating sweep signals for X and Y axes required to display the scanning line 01.R1.P1 corresponding to the transmission path ORP of ultrasonic beam on the display section 12 shown in FIG. 2 will be explained below with reference to FIG. 4.

Reference numeral 101 shows the oscillation element used with the variable angle beam probe for transmitting and receiving ultrasonic wave, numeral 104 an object material, numeral 401 a trigger pulse generator circuit for generating trigger pulses at predetermined regular intervals, numeral 402 a pulse oscillator circuit for producing a pulse output upon receipt of the trigger pulse from the trigger pulse generator circuit 401 and delivers ultrasonic wave to the oscillation element 101, numeral 403 an amplifier for amplifying the ultrasonic signal received by the oscillation element 101, and numeral 404 a brightness-modulation circuit for applying a brightness-modulation signal to the display section 212 of, say, a storage picture tube upon receipt of an output from the amplifier 403. Reference numeral 405 shows a saw-tooth wave generator circuit for generating a saw-tooth wave signal $V_1 t$ where $t$ is a generalized instant of time for the beam along path ORP, initiated by the trigger pulse from the trigger pulse generator circuit 401, i.e. $V_1 t$ represents the instantaneous distance along the path OR, with a gradient representing velocity $V_1$ of the sound in the ultrasonic transmission medium and applies it to the delay circuit 406. The voltage $E_\theta$ corresponding to the angle $\theta$ of the variable angle beam probe 300 is converted into signals of $\sin \theta$ and $\cos \theta$ by the sin.cos modulator 407, of which the signal of $\cos \theta$ is converted into a signal of $2d/\cos \theta$ which represents twice the distance OR in FIG. 1, thereby providing the transmission and reception path, by the divider 408. The signal $2d$ is provided by a signal source 419. The divided signal is compared with the saw-tooth wave signal $V_1 t$ in the delay circuit 406 and as a result a delay pulse with the delay time $t'_R$ is produced from the delay circuit 406. Namely, the instant at which $V_1 t$ equals $2d/\cos \theta$ produces time $t'_R$. The delay pulse causes the saw-tooth wave signal generator circuit 409 to produce a saw-tooth wave signal $$\frac{V_2}{2}(t - t'_R)$$

with gradient $V_2/2$, which is applied to the multipliers 410 and 411.

On the other hand, the output of $\sin \theta$ from the sin.-cos modulator 407 is applied to a coefficient multiplier 412 concerning the refractive index $n$, obtained from signal source 420, where a signal of $n.\sin \theta$ is produced and applied through the operations of the squarer 413, the divider 414 and the rooter 415 thereby to produce a signal of $\sqrt{1-n^2.\sin^2 \theta}$, which is multiplied by the signal $$\frac{V_2}{2}(t - t'_R)$$

in the multiplier 411 thereby to obtain a signal $$\frac{V_2}{2}\sqrt{1-n^2.\sin^2\theta}(t - t'_R).$$

The adder 416 adds this signal to signal $d$ representing the distance from the oscillation element 101 to the face 141 of the object material and a signal representing the Y-axis position $y_0$ of the probe 300, with the result that a Y-axis deflection signal Ey is obtained for the display section 212.

The multiplier 410 multiplies the signal $$\frac{V_2}{2}(t - t'_R)$$

by the signal of $n.\sin \theta$ from the coefficient multiplier 412 and produces a signal of $$n \cdot \frac{V_2}{2} \sin \theta (t - t'_R),$$

which is applied to the adder 419. Numeral 417 shows a divider which divides the signal $\sin \theta$ by signal $\cos \theta$ and produces the signal $\tan \theta$, which is converted into the signal $d.\tan \theta$ by the coefficient multiplier 418 and applied to the adder 419. As a result, the adder 419 adds the signals from the multiplier 410 and the coefficient multiplier 418 to a signal representing the X-axis position $x_0$ of the probe 300 thereby to produce an X-axis deflection signal Ex for the display section 212.

The sweep is performed in X and Y directions on the display section 212 with the deflection signals Ex and Ey obtained as above, while at the same time effecting brightness-modulation by an ultrasonic picture signal produced by the brightness-modulation circuit 404, thus making possible display of an acoustic sectional image of the object material.

An embodiment of the invention to obviate the problem of variable flaw detection sensitivity which arises from the fact that the efficiency of transmission of ultrasonic wave into the object varies with the incident angle of an ultrasonic beam in sector scan will be explained below with reference to FIG. 5.

Figure 3B:
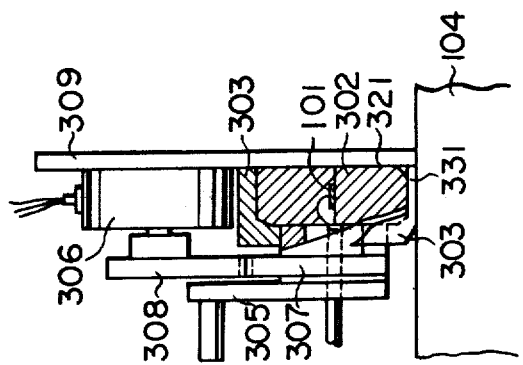
FIGS. 3a and 3b respectively show front and side views of an embodiment of the probe used in the apparatus according to the invention.
Figure 3A:
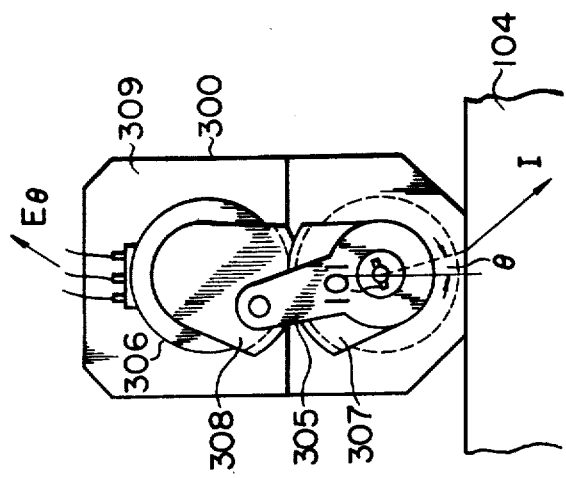
Figure 5:
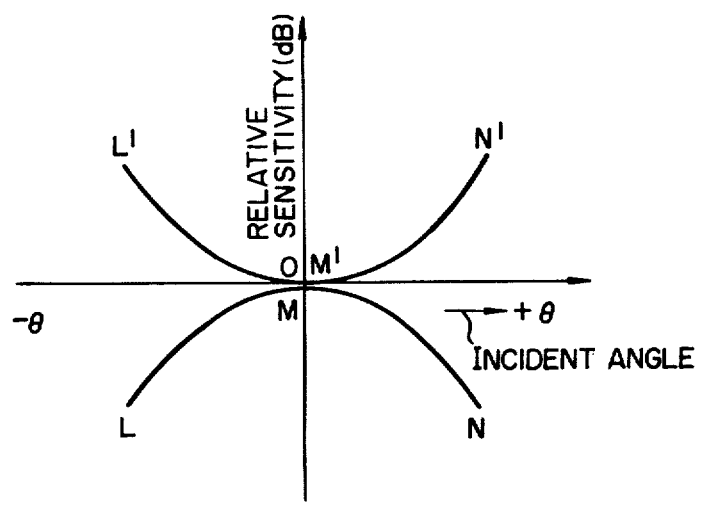
FIG. 5 is a diagram for explaining the effect of incident angle on the incident efficiency of ultrasonic beam and its compensation characteristic.

The fact that the flaw detection sensitivity tends to vary with the angle $\theta$ of the oscillation element used in the variable angle beam probe as shown in FIG. 3 is indicated by curve LMN of FIG. 5. It is possible to compensate for this tendency and hence to maintain a uniform flaw detection sensitivity regardless of changes in the angle $\theta$ by controlling the gain of the ultrasonic echo signal amplifier by means of the angle signal $E_\theta$ so as to follow the characteristic curve L'M'N' in response to the variable angle $\theta$.

Figure 6:
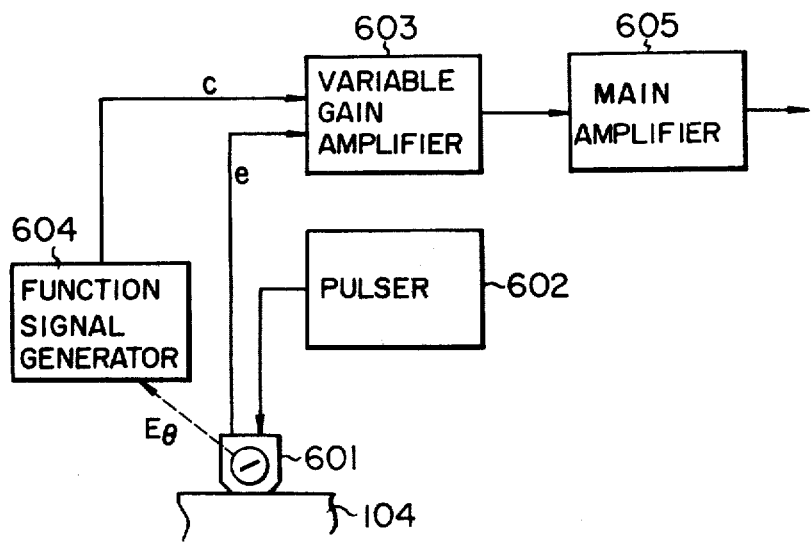
FIG. 6 is a diagram showing another embodiment of the invention.

A circuit for effecting such a signal control according to an embodiment of the invention is shown in the block diagram of FIG. 6. In the drawing, reference numeral 601 shows a variable angle beam probe capable of producing the angle signal $E_\theta$ in response to the angle $\theta$ of transmission and reception of ultrasonic wave as explained with reference to FIG. 3, numeral 602 a pulser for generating ultrasonic pulses by exciting the probe 601, numeral 603 a variable gain amplifier which amplifies the signal $e$ received by the probe 601 and whose amplification gain is capable of being controlled by an external control signal $c$, numeral 604 a function signal generator for generating the control signal c so as to enable the gain of the variable gain amplifier 603 to follow the curve L'M'N' of FIG. 5 in response to signal $E_\theta$ representing the angle $\theta$ and numeral 605 a main amplifier. The use of the above-described circuit arrangement permits the realization of an ultrasonic flaw detector with a uniform sensitivity characteristic regardless of the angle at which the probe is directed, that is, the incident angle of the ultrasonic beam.

It will be understood from the above description that according to the invention ultrasonic beams are transmitted in many directions from many points of the face of the object material to display an acoustic sectional image of the interior of the object material, so that the acoustic interfaces of any flaws and other defects that may exist inside of the object material are detected, while at the same time displaying their positions and shapes. Further, it is possible to faithfully display by sector scan an acoustic sectional image of an object material through which sound runs at a speed different from the speed in an ultrasonic transmission medium, resulting in a great practical value in industrial applications.

We claim:

1. An ultrasonic flaw detector comprising a variable angle beam probe for transmitting and receiving an ultrasonic beam and effecting either sector scan or a combination of sector scan and transfer scan of an object, said variable angle beam probe being maintained in acoustic contact with said object and generating an electrical signal corresponding to the direction of transmission and reception of the ultrasonic beam, display means for displaying an acoustic sectional image of said object by means of a scanning line corresponding to the transmission path and velocity of said ultrasonic beam within said object, said scanning line being brightness-modulated by an echo signal associated with said ultrasonic beam, said echo signal being received by said variable angle beam probe from said object, means responsive to said electrical signal for calculating the time required for said ultrasonic beam to go from said variable angle beam probe to the incident point of said object and return from said incident point to said variable angle beam probe, means for generating an output signal corresponding to the refraction of said ultrasonic beam at said incident point and the transmission speed of said ultrasonic beam within said object, and means for generating said scanning line for said display means in response to the outputs from said time calculating means and said means for generating said output signal.

2. An ultrasonic flaw detector according to claim 1, in which said time calculating means comprises means for calculating the distance from a transmission/reception element of said probe to the incident point of the object on the basis of the normal distance $d$ from said transmission/reception element to said object and the scanning angle $\theta$ of the ultrasonic beam generated by said variable angle beam probe, means for generating an output corresponding to $V_1t$ where $V_1$ is the velocity of sound within a medium for maintaining said probe in acoustic contact with said object and $t$ time which is variable, and means for generating an output which is delayed by a period of time twice the value of time $t$ which makes the output from said $V_1t$ generating means equal to the value of distance from said transmission/reception element to said incident point.

3. An ultrasonic flaw detector according to claim 1, in which said means for generating the scanning line for said display means comprises means for calculating the Y-axis component of the distance from a transmission/reception element to each point on the path of ultrasonic beam on the basis of the vertical distance $d$ from said transmission/reception element to said object, the refractive index $n$ of said object, the velocity of sound $V_2$ in said object and the angle $\theta$ of said variable angle beam probe, said Y-axis component calculating means superposing the results of said calculation on an output of means for applying to said display means a signal representing the position of said probe, said Y-axis component calculating means applying a Y-axis input to said display means, and means for calculating the X-axis component of the distance from said transmission/reception element to each point on the path of ultrasonic beam on the basis of the values $d$, $n$, $V_2$ and $\theta$, said X-axis component calculating means superposing the results of said calculation on an output from said means for applying to said display means a signal representing the position of said probe, said X-axis component calculating means applying an X-axis input to said display means.

4. An ultrasonic flaw detector according to claim 1, further comprising means for controlling an electrical signal corresponding to the ultrasonic beam received by said variable angle beam probe in accordance with the changes in the scanning angle $\theta$ of the ultrasonic beam generated by said variable angle beam probe.

5. An ultrasonic flaw detector according to claim 1, in which said variable angle beam probe comprises arcuately movable means having an oscillation element for transmission and reception of ultrasonic wave, means for supporting said arcuately movable means and maintaining said arcuately movable means in acoustic contact with said object, and means for generating an electrical signal corresponding to the rotational angle of said arcuately movable means.

6. An ultrasonic flaw detector comprising:
 a variable angle beam probe for transmitting an ultrasonic beam and receiving an echo of the beam, said probe being capable of at least one of sector scan or a combination of sector scan and transfer scan of an object to generate electrical signals representative of both the direction of transmission of said ultrasonic beam and said echo, said probe being maintained in an acoustic contact with said object;
 display means for displaying an acoustic sectional image of said object by means of a scanning line corresponding to the transmission path and velocity of said ultrasonic beam within said object, said scanning line being brightness-modulated by said echo;
 calculating means responsive to said electrical signals from said probe for calculating time ($t'_R$) required for said ultrasonic beam to go from said probe to an incident point on said object and return from said incident point to said probe;
 first circuit means responsive to the output of said calculating means for generating X- and Y- components of a first signal contributing to the formation of said scanning line, said X- and Y- components of said first signal corresponding to a distance between said incident point on said object and a point within said object from which said ultrasonic beam reflects to said incident point;

second circuit means responsive to said electrical signals from said probe for generating X- and Y-components of a second signal contributing to the formation of said scanning line, said X- and Y-components of said second signal corresponding to a distance between said probe and said incident point on said object;

third circuit means for generating a third signal constituting said scanning line and corresponding to X- and Y-components of a coordinate position of said probe;

fourth circuit means for adding all of the said X-components for application to said display means to produce an X-component for said scanning line; and fifth circuit means for adding all of the said Y-components for application to said display means to produce a Y-component for said scanning line.

7. An ultrasonic flaw detector according to claim 6, in which said time calculating means comprises means for calculating the distance from a transmission/reception element of said probe to the incident point of the object on the basis of the normal distance $d$ from said transmission/reception element to said object and the scanning angle $\theta$ of the ultrasonic beam generated by said variable angle beam probe, means for generating an output corresponding to $V_1 t$ where $V_1$ is the velocity of sound within a medium for maintaining said probe in acoustic contact with said object and $t$ time which is variable, and means for generating an output which is delayed by a period of time twice the value of time $t$ which makes the output from said $V_1 t$ generating means equal to the value of distance from said transmission/reception element to said incident point.

8. An ultrasonic flaw detector according to claim 6, further comprising means for controlling an electrical signal corresponding to the ultrasonic beam received by said variable angle beam probe in accordance with the changes in the scanning angle $\theta$ of the ultrasonic beam generated by said variable angle beam probe.

9. An ultrasonic flaw detector according to claim 8, wherein said means for controlling said electrical signal corresponding to the ultrasonic beam received by said probe comprises a function generator circuit responsive to said electrical signal corresponding to the direction of transmission and reception of said ultrasonic beam, said function generator circuit providing a control signal for varying the gain of a variable gain amplifier to which said electrical signal corresponding to the received ultrasonic beam is applied.

10. An ultrasonic flaw detector according to claim 6, in which said variable angle beam probe comprises arcuately movable means having an oscillation element for transmission and reception of ultrasonic wave, means for supporting said arcuately movable means and maintaining said arcuately movable means in acoustic contact with said object, and means for generating an electrical signal corresponding to the rotational angle of said arcuately movable means.

11. An ultrasonic flaw detector according to claim 4, wherein said means for controlling said electrical signal corresponding to the ultrasonic beam received by said probe comprises a function generator circuit responsive to said electrical signal corresponding to the direction of transmission and reception of said ultrasonic beam, said function generator circuit providing a control signal for varying the gain of a variable gain amplifier to which said electrical signal corresponding to the received ultrasonic beam is applied.

* * * * *